UNITED STATES PATENT OFFICE.

SAMUEL P. SADTLER, OF PHILADELPHIA, PENNSYLVANIA, ASSIGNOR TO EDWIN JOHNSON, OF PITTSBURG, PENNSYLVANIA.

COMPOSITION FOR REMOVING PAINT OR VARNISH.

No. 871,525.     Specification of Letters Patent.     Patented Nov. 19, 1907.

Application filed November 18, 1903. Serial No. 181,618.

*To all whom it may concern:*

Be it known that I, SAMUEL P. SADTLER, a citizen of the United States, residing at Germantown, Philadelphia, in the county of Philadelphia and State of Pennsylvania, have invented certain new and useful Improvements in Compositions for Removing Paint or Varnish, of which the following is a specification.

This invention relates to a preparation for removing paint, varnish, &c., from wood, metal and other surfaces without injury thereto.

The preparation consists primarily of acetone oil which is the essential and active ingredient. By acetone oil I mean the mixture of ketones which is obtained as a by-product along with acetone in the preparation of the latter and which is separated in the purification of the acetone.

While acetone oil is a powerful solvent, it has been found to operate more quickly and thoroughly when combined with one or more other chemicals which are, preferably, also solvents. Benzol, toluol and either wood or grain alcohol may be advantageously combined with the acetone oil, and when the same are used a desirable formula for the composition is—acetone oil, two parts; benzol, one part; toluol, one part; and a mixing agent—such as alcohol, one part, the same being thoroughly mixed by agitation.

Either benzol or toluol may be used to the exclusion of the other, though it is preferable to employ both. Benzol is more costly than toluol, whereas the objectionable odor of toluol is neutralized when combined with benzol. In addition to its qualities as a solvent, alcohol combines with the other ingredients in making a permanent, water-clear solution as it mixes or combines with the water separated by the benzol or toluol.

The composition does not evaporate rapidly, remaining on the surface to which it is applied sufficiently long to loosen or raise the paint varnish or other matter, so that when wiped off the surface is absolutely clean and may if desired be immediately refinished.

As I believe myself to be the first to employ acetone oil in a composition for removing paint, varnish, etc., the invention is not restricted in the matter of the other ingredients or their number, nor to the described manner of compounding the same.

I claim:

1. A composition for removing paint or varnish containing acetone oil, benzol, and another solvent.

2. A composition for removing paint or varnish containing acetone oil, benzol, and a mixing agent.

3. A composition for removing paint or varnish containing acetone oil, benzol, and alcohol.

4. A composition for removing paint or varnish containing acetone oil, benzol, toluol, and a mixing agent.

5. A composition for removing paint or varnish containing acetone oil, toluol, and a mixing agent.

In testimony whereof I affix my signature in presence of two witnesses.

SAMUEL P. SADTLER.

Witnesses:
   WM. C. KEAN, Jr.,
   DAYTON LARZALERE.